United States Patent
Cohen et al.

(10) Patent No.: US 7,957,394 B1
(45) Date of Patent: Jun. 7, 2011

(54) AUTOMATIC NETWORK SWITCH CONFIGURATION TO SUPPORT QUALITY OF SERVICE

(75) Inventors: Yuval Cohen, Raanana (IL); Tal Anker, Modiin (IL)

(73) Assignee: Marvell International Ltd., Hamilton (BM)

( * ) Notice: Subject to any disclaimer, the term of this patent is extended or adjusted under 35 U.S.C. 154(b) by 1306 days.

(21) Appl. No.: 10/886,860

(22) Filed: Jul. 7, 2004

(51) Int. Cl.
   *H04L 12/28* (2006.01)
(52) U.S. Cl. .................. 370/395.21; 370/230.1; 370/400
(58) Field of Classification Search .................. 370/389, 370/357, 395.21, 395.41, 395.43, 412–418, 370/428, 468, 230–231, 400, 235, 466; 709/223, 709/225; 713/150; 715/205, 234
See application file for complete search history.

(56) References Cited

U.S. PATENT DOCUMENTS

| | | | |
|---|---|---|---|
| 6,091,709 A * | 7/2000 | Harrison et al. ............. 370/235 |
| 6,631,134 B1 | 10/2003 | Zadikian et al. |
| 6,640,248 B1 | 10/2003 | Jorgensen |
| 6,982,980 B2 * | 1/2006 | Fukuda et al. ............ 370/395.21 |
| 7,042,848 B2 * | 5/2006 | Santiago et al. .............. 370/253 |
| 7,050,396 B1 * | 5/2006 | Cohen et al. ................... 370/235 |
| 7,075,927 B2 * | 7/2006 | Mo et al. ........................ 370/389 |
| 7,123,622 B2 * | 10/2006 | Bass et al. ..................... 370/413 |
| 2001/0005381 A1 * | 6/2001 | Sugiyama ..................... 370/466 |
| 2001/0052012 A1 | 12/2001 | Rinne et al. |
| 2002/0065907 A1 * | 5/2002 | Cloonan et al. ............... 709/223 |
| 2003/0118029 A1 * | 6/2003 | Maher et al. ............ 370/395.21 |
| 2003/0140131 A1 * | 7/2003 | Chandrashekhar et al. .. 709/223 |
| 2004/0117613 A1 * | 6/2004 | Edmondson .................. 713/150 |
| 2005/0216822 A1 * | 9/2005 | Kyusojin et al. ........... 715/501.1 |

* cited by examiner

*Primary Examiner* — Aung S Moe
*Assistant Examiner* — Vinncelas Louis

(57) ABSTRACT

A method, apparatus, and computer-readable media for a network device comprises a plurality of ports to exchange packets of data with one or more networks according to Quality of Service parameters configured for each of the ports; a forwarding engine to forward the packets of data between the ports; and a control plane processor to identify one or more planned data flows through the network device between the ports; wherein the control plane processor identifies associations between each of the planned data flows and one of a plurality of services for the planned data flows; and wherein the network device automatically configures the Quality of Service parameters of the ports according to the services and the associations between the planned data flows and the services.

35 Claims, 2 Drawing Sheets

AUTOMATIC NETWORK SWITCH CONFIGURATION TO SUPPORT QUALITY OF SERVICE

BACKGROUND

The present invention relates generally to data communications. More particularly, the present invention relates to configuring network switches for quality of service.

The rapidly increasing popularity of networks such as the Internet has spurred the development of network services such as streaming audio and streaming video. These new services have different latency requirements than conventional network services such as electronic mail and file transfer. New Quality of Service (QoS) standards require that network devices, such as network switches, address these latency requirements. For example, the IEEE 802.1 standard divides network traffic into several classes of service based on sensitivity to transfer latency, and prioritizes these classes of service. The highest class of service is recommended for network control traffic, such as switch-to-switch configuration messages. The remaining classes are recommended for user traffic. The two highest user traffic classes of service are generally reserved for streaming audio and streaming video. Because the ear is more sensitive to missing data than the eye, the highest of the user traffic classes of service is used for streaming audio. The remaining lower classes of service are used for traffic that is less sensitive to transfer latency, such as electronic mail and file transfers.

Devices such as network switches must be configured appropriately to support quality of service. In particular, the user must configure the Quality of Service parameters of the ports and forwarding databases of each network switch to support the bandwidth and latency requirements of each data flow the user expects to pass through the network switch. In conventional network switches, the user must configure the Quality of Service parameters of the ports and forwarding databases individually, for example by setting the metering for the ingress port of each data flow, setting the queuing priorities for the egress ports of each data flow, and so on. As the number of ports and services grows, this task becomes increasingly complex.

SUMMARY

In general, in one aspect, the invention features a method, apparatus, and computer-readable media for a network device comprising a plurality of ports to exchange packets of data with one or more networks according to Quality of Service parameters configured for each of the ports; a forwarding engine to forward the packets of data between the ports; and a control plane processor to identify one or more planned data flows through the network device between the ports; wherein the control plane processor identifies associations between each of the planned data flows and one of a plurality of services for the planned data flows; and wherein the network device automatically configures the Quality of Service parameters of the ports according to the services and the associations between the planned data flows and the services.

Particular implementations can include one or more of the following features. The control plane processor identifies the plurality of planned data flows between the ports based on user input describing the planned data flows. To identify the associations between each of the planned data flows and one of the plurality of services, the control plane processor identifies a plurality of profiles each describing one of the services and service parameters for the one of the services, and identifies associations between each of the planned data flows and one of the profiles. The control plane processor identifies the associations between each of the planned data flows and one of the plurality of services based on user input describing the associations between each of the planned data flows and one of the plurality of services. The control plane processor identifies the services. The control plane processor identifies the services based on user input describing the services. Each of the ports comprises a plurality of output queues to transmit the packets of data to the one or more networks according to a priority scheme, and wherein to automatically configure the Quality of Service parameters of the ports according to the services and the associations between the planned data flows and the services, the network device associates one or more of the queues with one or more of the services. Each of the ports comprises a plurality of input queues to receive the packets of data from the one or more networks according to a priority scheme, and wherein to automatically configure the Quality of Service parameters of the ports according to the services and the associations between the planned data flows and the services, the network device associates one or more of the queues with one or more of the services. To automatically configure the Quality of Service parameters of the ports according to the services and the associations between the planned data flows and the services, the network device applies an input filter at an input port for the planned data flow. Each data flow comprises a plurality of packets, and wherein the services are selected from the group consisting of ensuring that each packet in the associated data flow will experience the least possible latency in the switch; ensuring that no packet in the associated data flow will experience more than a predetermined latency in the switch; guaranteeing a minimum bandwidth for the packets in the associated data flow; ensuring a predetermined bandwidth range for the packets in the associated data flow; dropping or marking drop precedence for packets exceeding a predetermined bandwidth in the associated data flow; prioritizing the packets in the associated data flow; and dropping all packets in the associated data flow. A network switch comprises the network device.

The details of one or more implementations are set forth in the accompanying drawings and the description below. Other features will be apparent from the description and drawings, and from the claims.

DESCRIPTION OF DRAWINGS

FIG. 1 shows a network switch and a user terminal, which can be a personal computer or the like.

Figure 1:
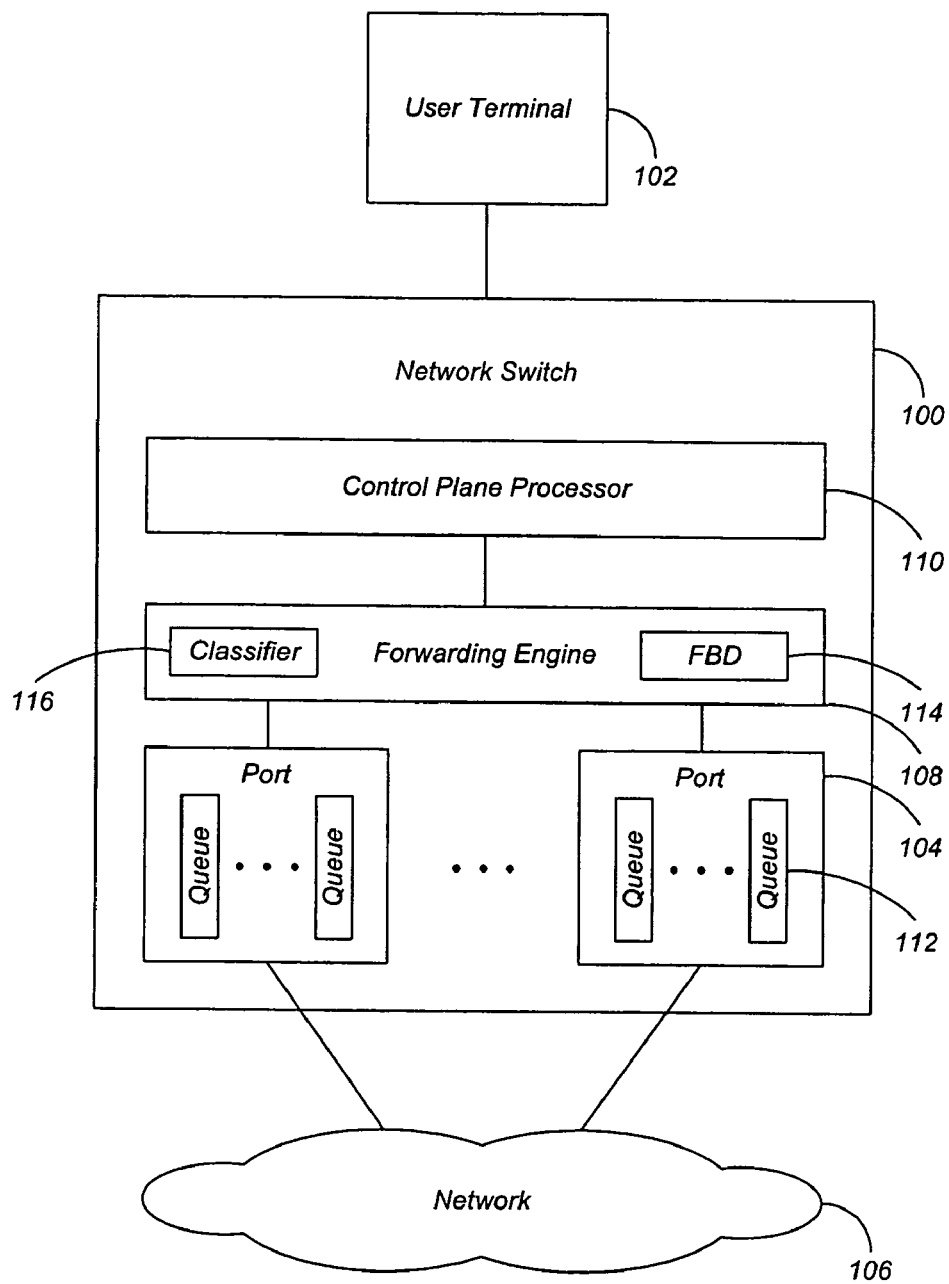

The leading digit(s) of each reference numeral used in this specification indicates the number of the drawing in which the reference numeral first appears.

DETAILED DESCRIPTION

Embodiments of the present invention automatically configure network switches to support quality of service based on information provided by the user. The user selects, and can customize, a service for each data flow to pass through the switch. The switch then automatically (that is, without user intervention) configures the Quality of Service parameters of its ports and forwarding databases accordingly.

FIG. 1 shows a network switch 100 and a user terminal 102, which can be a personal computer or the like. Switch 100 comprises a plurality of ports 104 for exchanging packets of data with one or more networks 106, a forwarding engine 108, and a control plane processor 110 for controlling switch 100. Forwarding engine 108 comprises a forwarding database (FDB) 114 and a classifier 116. Forwarding engine 108 transfers the packets of data between ports 104 according to the contents of forwarding database 114, as is well-known in the relevant arts. Classifier 116 identifies incoming packets based on classification rules, as is also well-known in the relevant arts.

Each port 104 comprises a plurality of queues 112 for enqueueing the packets of data. In an output-queued switch, the packets of data are enqueued to queues 112 before egress from switch 100. In an input-queued switch, the packets of data are enqueued to queues 112 after ingress to switch 100. In either type of switch, the queues 112 in a port 104 generally have different priorities, and are managed according to some scheduling scheme, such as strict priority or weighted round robin.

Figure 2:
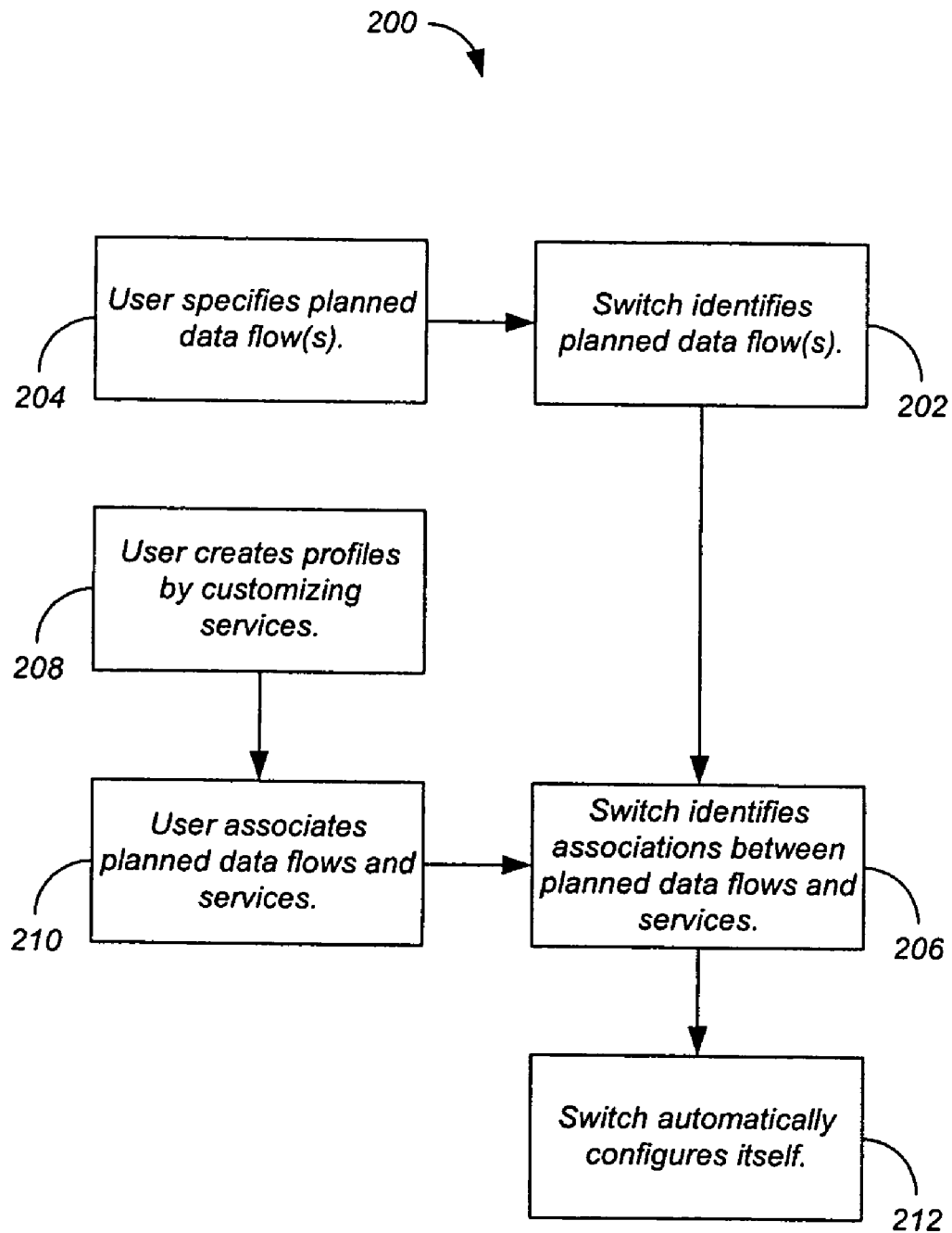
FIG. 2 shows a process for configuring the network switch of FIG. 1 according to a preferred embodiment.

FIG. 2 shows a process 200 for configuring switch 100 according to a preferred embodiment. Switch 100 identifies one or more planned data flows for the switch (step 202). In general, the user specifies the planned data flows (step 204), and control plane processor 110 identifies the planned data flows based on the user input. The user input can be provided by user terminal 102 by command line interface, by a graphical user interface, by simple network management protocol (SNMP), and the like. The user can specify each data flow by specifying a value or range of values for all or part of one or more fields in each packet in the data flow. For example, these fields can represent the media access control (MAC) or Internet protocol (IP) source address of the packet, the transport control protocol (TCP) or user datagram protocol (UDP) destination port of the packet, the protocol type of the packet, and so on.

Switch 100 also identifies associations between each of the planned data flows and one of a plurality of services for the planned data flows (step 206). In general, switch 100 offers a plurality of such services, which can be customized by specifying predetermined configuration parameters for the service. Examples of such services include ensuring that each packet in the data flow will experience the least possible latency in the switch, ensuring that no packet in the data flow will experience more than a predetermined latency in the switch, guaranteeing a minimum bandwidth for the packets in the data flow, ensuring a predetermined bandwidth range for the packets in the data flow, dropping or marking drop precedence for packets exceeding a predetermined bandwidth in the data flow, prioritizing the packets in the data flow, dropping all packets in the data flow, and the like. Several such services, and their configuration parameters, are listed below in Table 2.

In general, control plane processor 110 identifies the associations between the planned data flows and services based on user input. In a preferred embodiment, the user creates a plurality of profiles (step 208) by customizing one or more of the services offered by switch 100. In particular, the user creates each profile by selecting one of the services and selecting values for the configuration parameters for the selected service. The user then associates each of the planned data flows with one of the profiles (step 210). The user then provides this information to switch 100, which identifies the profiles and the associations between the planned data flows and profiles based on the user input.

Control plane processor 110 then automatically configures switch 100 according to the profiles and the associations between the planned data flows and the profiles (step 212). Of course, this configuration can be performed by some other processor such as forwarding engine 108. Control plane processor 110 modifies forwarding database 114 to route the planned data flow from its ingress port to its egress port(s) according to conventional methods. Control plane processor 110 configures Quality of Service parameters of the ports 104 as described in detail below.

For some services, control plane processor 110 configures Quality of Service parameters of the ports 104 by associating one or more of the queues with one or more of the services. Thus the packets in a data flow associated with a service will be enqueued to a queue for that service. Each queue has a priority, for example defined by a scheduling scheme and a scheduling weight. Table 1 shows an example of queue assignment scheme according to one embodiment.

TABLE 1

| Queue number | Service | Scheduling scheme | WRR weight |
|---|---|---|---|
| 8 | Committed Delay | SP | |
| 7 | Min Delay | SP | |
| 6 | Guaranteed Min BW | WRR | |
| 5 | Rate Limit | WRR | - |
| 4 | High priority | WRR | |
| 3 | Mid priority | | |
| 2 | Low Priority | WRR | |
| 1 | Best Effort | WRR | |

In the example of Table 1, each of several services is assigned to one or more of eight queues, each having one of two scheduling schemes: strict priority (SP) and weighted round robin (WRR). Each of the WRR queues has a weight that is calculated and configured based on parameters specified by the user or by the service, for example based on bandwidth (BW). In addition, queue lengths and thresholds are configured as well. Also, some services require the configuration of one or more meters related to the flow. Of course, Table 1 is presented only as an illustration.

For some services, control plane processor 110 applies an input filter at an input port for the planned data flow. For example, the input port discards traffic in a data flow that exceeds a predetermined bandwidth threshold.

Now several services are discussed that are available in a preferred embodiment for an output-queued switch. The "best effort" service offers no guarantee, and so has no configuration parameters. This service is implemented by assigning traffic in the data flow to the lowest priority port queue 112 with weighted round robin scheduling.

In a "minimum delay" service, packets of the data flow experience the minimum possible latency from the time they are received at the ingress port to the time they are transmitted from the egress port(s). A "maximum allowed bandwidth" configuration parameter specifies the threshold above which packets will be discarded. This service is implemented by assigning traffic in the data flows to the highest priority port queue 112. However, if the "committed delay" service is activated (see below), this service is implemented by assigning traffic in the data flow to the second highest priority port queue 112. The queue 112 is configured with strict priority scheduling. Rate limiting is applied at the ingress port 104 for the data flow to comply with the maximum allowed bandwidth parameter. The same bandwidth value is reserved on the egress port queue 112 for the data flow.

In a "committed delay" service, packets for the data flow experience a short delay that is less than a maximum delay value that the user can specify. A "maximum allowed bandwidth" configuration parameter specifies the threshold above which packets will be discarded. A "maximum delay" configuration parameter sets the value of the maximum delay. This service is implemented by assigning packets in the data flow to the highest priority port queue 112 with strict priority scheduling. Rate limiting is applied at the ingress port 104 of the data flow to comply with the maximum allowed bandwidth configuration parameter. The same bandwidth value is reserved on the egress port queue 112 for the data flow. The length of the egress port queue 112 for the data flow is limited according to the maximum delay configuration parameter.

A "min-max bandwidth" service guarantees at least a minimum bandwidth for the data flow, and allows excess traffic in the data flow up to a maximum bandwidth when spare bandwidth is available for the output port of the data flow. Above the maximum bandwidth threshold, traffic in the data flow is discarded. The user can specify only the "minimum bandwidth" configuration parameter, thereby guaranteeing the minimum bandwidth and allowing all excess traffic if spare bandwidth is available. The user can specify only the maximum bandwidth configuration parameter, thereby guaranteeing that bandwidth at the output; all excess traffic in the data flow is dropped. To implement this service, traffic in this data flow is assigned to an output port queue 112 scheduled by weighted round robin. The output port queue 112 is weighted to allow the sum of all flows assigned to the queue 112 according to the minimum guaranteed bandwidth. The data flow is metered at the ingress port 1104 with cascaded metering. When a first meter (minimum bandwidth) is exceeded, packets are marked for discard, for example by changing bits in the packet header according to conventional methods. When a second meter (maximum bandwidth) is exceeded, packets are discarded.

In a "rate limit" service, traffic in the data flow is rate-limited at its ingress port 104. Any traffic above a specified rate is discarded. There is no bandwidth guarantee at the egress port 104 for the data flow. An "ingress rate" configuration parameter specifies the threshold above which traffic is dropped. This service is implemented by metering the flow at its ingress port 104 with a meter set to the specified ingress rate. Traffic for the data flow is assigned to an egress port queue 112 with weighted round robin scheduling.

In a "trust VPT" (VLAN priority) service, switch 100 uses the VPT field in each packet to classify the packet to one of three output queues 112 (High priority, Mid priority, and Low priority) having weighted round robin scheduling. Of course, any number of output queues can be used.

In a "trust DSCP" (DiffServ Code Point) service, switch 100 uses the DSCP field in each packet to classify the packet to one of three output queues 112 (High priority, Mid priority, and Low priority) having weighted round robin scheduling. Of course, any number of output queues can be used.

In a "drop" service, all packets in the data flow are dropped. No configuration parameter is required.

In a "drop and disable port" service, all packets in the data flow are dropped, and the ingress port 104 for the data flow is disabled. No configuration parameter is required.

Of course, the above list of services is presented only as an illustration. Other services can be offered by switch 100.

As described above, a user can create customized services, referred to herein as "profiles," using the services offered by the switch. The user can then assign these profiles to particular data flows. Three example profiles are presented in Table 2.

TABLE 2

| Profile name | Profile Type | Service Type | Configuration Parameters | Ingress Burst size | New DSCP | New VPT |
| --- | --- | --- | --- | --- | --- | --- |
| My voice traffic | Regular | Minimum delay | Max BW = 1 Mbit | 2 kbyte | 7 | 4 |
| My data traffic | Regular | Min-Max BW | Min BW = 20 Mbit Max BW = 40 Mbit | 4 kbyte | 24 | Keep original |
| My aggregate HTTP traffic | Aggregate | Min-Max BW | Max BW = 50 Mbit | 4 kbyte | 24 | Keep original |

Referring to Table 2, each profile has a name that the user can employ to reference the profile, for example when assigning the profile to a data flow. Each profile also has one of two profile types—regular and aggregate—which describe how the profile is applied when assigned to multiple interfaces/data flows. When a regular profile is applied to multiple interfaces/data flows, the configuration parameters are applied to each of the interfaces/data flows individually. This is useful when the user wants to define a single profile and use it multiple times. For example, referring to Table 2, if the profile "my data traffic" is assigned to 3 different ingress ports, the switch will allow a maximum bandwidth of 40 Mbit on each of the ingress ports. In the same manner, 20 Mbit of bandwidth will be reserved on each output port related to each of the flows.

On the other hand, when an aggregate profile is applied to multiple interfaces/data flows, the configuration parameters are applied to all of the interfaces/data flows collectively. For example, referring again to Table 2, if the profile "my aggregate HTTP traffic" is assigned to 3 different ingress ports, the system will limit the total traffic from all 3 ports to 50 Mbit.

Referring again to Table 2, each profile has a "Service Type" that identifies the service upon which that profile is based. Each profile also has any configuration parameters specified by the user.

Each profile also has an "Ingress Burst Size" that identifies the maximum size of back-to-back packets/bytes allowed for a specific flow and ingress port.

Each profile has a "New DSCP" value. All packets in a data flow for this profile will have their DSCP values rewritten with this new value of the DSCP. It is also possible to keep the original DSCP. For each type of service, only a single assignment of new DSCP is allowed. The first profile definition in the table will set the same "New DSCP" value for all subsequent profiles using the same service.

Each profile has a "New VPT" value. All packets in a data flow for this profile will have their VPT values rewritten with this new value of the VPT. It is also possible to keep the original VPT. For each type of service, only a single assignment of new VPT is allowed. The first profile definition in the table will set the same "New VPT" value for all subsequent profiles using the same service. In other embodiments, the "New VPT" value can instead be part of the service rules discussed below with reference to Table 3.

After defining profiles, the user can apply them to specific data flows, for example using "service rules." Several examples of such service rules are shown in an example service table in Table 3.

TABLE 3

| Flow name (Classification) | Input Interface | Output Interface | Assigned Profile |
|---|---|---|---|
| data1 (IP src = 192.*.*.* Port = HTTP) | Ports = 2,3,5 | Port = 9 | My data traffic |
| data2 (DSCP = 40) | LAG = 6 | Port = 9 | My data traffic |
| voice (VLAN id = 5) | Ports = * | Port = * | My voice traffic |
| HTTP (IP dst = 124.8.*.* Port = HTTP) | Ports = 7,8 | Port = 10 | My aggregate HTTP traffic |
| drop (MAC src = . . .) | Ports = 5,7 | NA | Drop |

Each service rule has a name and classification rule, and is associated with an ingress interface such as one or more ports or link aggregation groups (LAG). The user can specify the egress port by providing a port list. In that case, the service will be reserved/guaranteed on all listed ports. It is also possible to specify "All" for the output port. In that case bandwidth will be reserved on all output ports. Each service rule is also assigned one of the profiles.

The switch can provide warning messages to the user when any problems are encountered during the configuration, for example if the user attempts to commit more bandwidth on a port that the port can provide. The switch can also provide similar warnings during runtime, for example when port parameters change due to auto-negotiation.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
a plurality of ports to exchange packets of data with one or more networks according to Quality of Service parameters configured for each of the ports;
a forwarding engine to forward the packets of data between the ports; and
a control plane processor to identify one or more planned data flows through the network device between the ports by identifying at least one value in the packets;
wherein the control plane processor identifies association data to identify associations between each of the planned data flows and a profile including one of a plurality of services for the planned data flows,
wherein the association data included in the associations is selected during a first selection process for each of the planned data flows following selection of the value in the packets during a second selection process,
wherein the profile is configured during a third selection process and the third selection process occurs after the packets enter the network device, and
wherein the network device automatically configures the Quality of Service parameters of the ports according to the services and the associations between the planned data flows and the services.

2. The network device of claim 1,
wherein the control plane processor identifies the planned data flows between the ports based on user input of the first selection process describing the planned data flows, and the user input specifies the at least one value in the packets, and
wherein the first selection process and the second selection process occur after the packets enter the network device.

3. The network device of claim 2, wherein a designator value in each of the packets in particular ones of the planned data flows is rewritten based on the profile in order to designate an output queue.

4. The network device of claim 1,
wherein the associations are identified after the planned data flows are identified, and
wherein to identify the associations between each of the planned data flows and one of the plurality of services, the control plane processor:
identifies a plurality of profiles including the profile each describing one of the services and service parameters for the one of the services, and
identifies the association data to identify the associations between each of the planned data flows and one of the profiles.

5. The network device of claim 1, wherein:
the control plane processor identifies the association data to identify the associations between each of the planned data flows and one of the plurality of services based on user input of the second selection process describing the associations between each of the planned data flows and one of the plurality of services, and the user input specifies the association data that describes the associations.

6. The network device of claim 1, wherein:
the control plane processor identifies the services.

7. The network device of claim 6, wherein:
the control plane processor identifies the services based on user input describing the services, and the user input specifies the association data that describes the associations.

8. The network device of claim 1:
wherein each of the ports comprises a plurality of output queues to transmit the packets of data to the one or more networks according to a priority scheme, and wherein:
to automatically configure the Quality of Service parameters of the ports according to the services and the associations between the planned data flows and the services, the network device associates one or more of the queues with one or more of the services,
wherein the network device associates one or more of the queues with one or more of the services so that a first of the one or more queues is associated with a first of the one or more of the services and a second of the one or more queues is associated with a second of the one or more of the services that is different than the first of the one or more of the services, and
wherein the first of the one or more queues is not associated with the second of the one or more of the services.

9. The network device of claim 8, wherein each data flow comprises a plurality of packets, and wherein the services are selected from the group consisting of:
ensuring that each packet in an associated data flow will experience the least possible latency in the network device;
ensuring that no packet in the associated data flow will experience more than a predetermined latency in the network device;
guaranteeing a minimum bandwidth for the packets in the associated data flow;
ensuring a predetermined bandwidth range for the packets in the associated data flow;
dropping or marking drop precedence for packets exceeding a predetermined bandwidth in the associated data flow;
prioritizing the packets in the associated data flow; and
dropping all packets in the associated data flow.

10. The network device of claim 1:
wherein each of the ports comprises a plurality of input queues to receive the packets of data from the one or more networks according to a priority scheme, and wherein:
to automatically configure the Quality of Service parameters of the ports according to the services and the associations between the planned data flows and the services, the network device associates one or more of the queues with one or more of the services.

11. The network device of claim 1, wherein:
to automatically configure the Quality of Service parameters of the ports according to the services and the associations between the planned data flows and the services, the network device applies an input filter at an input port for the planned data flow.

12. A network switch comprising the network device of claim 1.

13. The network switch of claim 12, wherein the network switch provides a warning message to a user during configuration of the Quality of Service parameters when a problem is encountered.

14. A method for configuring a network device comprising a plurality of ports for exchanging packets of data with one or more networks according to Quality of Service parameters configured for each of the ports, the method comprising:
identifying one or more planned data flows through the network device between the ports by identifying at least one value in the packets;
identifying association data to identify associations between each of the planned data flows and a profile including one of a plurality of services for the planned data flows,
selecting the association data included in the associations during a first selection process for each of the planned data flows following selection of the value in the packets during a second selection process,
wherein the profile is configured during a third selection process, and
wherein the third selection process occurs after the packets enter the network device; and
automatically configuring the Quality of Service parameters of the ports according to the services and the associations between the planned data flows and the services.

15. The method of claim 14, wherein identifying the planned data flows between the ports comprises:
receiving user input of the first selection process describing the planned data flows, wherein the user input specifies the at least one value in the packets.

16. The method of claim 14,
wherein the associations are identified after the planned data flows are identified, and
wherein identifying the associations between each of the planned data flows and one of the plurality of services comprises:
identifying a plurality of profiles including the profile each describing one of the services and service parameters for the one of the services; and
identifying the association data to identify associations between each of the planned data flows and one of the profiles.

17. The method of claim 14, wherein identifying the associations between each of the planned data flows and one of the plurality of services comprises:
receiving user input that specifies the association data to describe the associations between each of the planned data flows and one of the plurality of services.

18. The method of claim 14, further comprising:
identifying the services.

19. The method of claim 18, wherein identifying the services comprises:
receiving user input describing the services, wherein the user input specifies the association data that describes the associations.

20. The method of claim 14, wherein each port comprises a plurality of output queues that transmit the packets of data to the one or more networks according to a priority scheme, and wherein automatically configuring the Quality of Service parameters of the ports according to the services and the associations between the planned data flows and the services comprises:
associating one or more of the queues with one or more of the services.

21. The method of claim 14, wherein each port comprises a plurality of input queues that receive the packets of data from the one or more networks according to a priority scheme, and wherein automatically configuring the Quality of Service parameters of the ports according to the services and the associations between the planned data flows and the services comprises:
associating one or more of the queues with one or more of the services.

22. The method of claim 14, wherein automatically configuring the ports according to the services and the associations between the planned data flows and the services comprises:

applying an input filter at an input port for the planned data flow.

23. The method of claim 14, wherein each data flow comprises a plurality of packets, and wherein the services are selected from the group consisting of:
   ensuring that each packet in the associated data flow will experience the least possible latency in the network device;
   ensuring that no packet in the associated data flow will experience more than a predetermined latency in the network device;
   guaranteeing a minimum bandwidth for the packets in the associated data flow;
   ensuring a predetermined bandwidth range for the packets in the associated data flow;
   dropping or marking drop precedence for packets exceeding a predetermined bandwidth in the associated data flow;
   prioritizing the packets in the associated data flow; and
   dropping all packets in the associated data flow.

24. The method of claim 14, wherein a network switch comprises the network device.

25. A computer program stored on a non-transitory machine readable storage device, the computer program embodying instructions executable by a computer for configuring a network device comprising a plurality of ports for exchanging packets of data with one or more networks according to Quality of Service parameters for each of the ports, the computer program comprising:
   identifying one or more planned data flows through the network device between the ports by identifying at least one value in the packets;
   identifying association data to identify associations between each of the planned data flows and a profile including one of a plurality of services for the planned data flow, selecting the association data included in the associations during a first selection process for each of the planned data flows following selection of the value in the packets during a second selection process, wherein the profile is configured during a third selection process, and wherein the third selection process occurs after the packets enter the network device; and
   automatically configuring the Quality of Service parameters of the ports according to the services and the associations between the planned data flows and the services.

26. The computer program of claim 25, wherein identifying the planned data flows between the ports comprises:
   receiving user input of the first selection process describing the planned data flows, wherein the user input specifies the at least one value in the packets.

27. The computer program of claim 25,
   wherein the associations are identified after the planned data flows are identified, and
   wherein identifying the associations between each of the planned data flows and one of the plurality of services comprises:
   identifying a plurality of profiles including the profile each describing one of the services and service parameters for the one of the services; and
   identifying the association data to identify the associations between each of the planned data flows and one of the profiles.

28. The computer program of claim 25, wherein identifying the associations between each of the planned data flows and one of the plurality of services comprises:
   receiving user input that specifies the association data that describes the associations between each of the planned data flows and one of the plurality of services.

29. The computer program of claim 25, further comprising: identifying the services.

30. The computer program of claim 29, wherein identifying the services comprises:
   receiving user input describing the services, wherein the user input specifics the association data that describes the associations.

31. The computer program of claim 25, wherein each port comprises a plurality of output queues that transmit the packets of data to the one or more networks according to a priority scheme, and wherein automatically configuring the Quality of Service parameters of the ports according to the services and the associations between the planned data flows and the services comprises:
   associating one or more of the queues with one or more of the services.

32. The computer program of claim 25, wherein each port comprises a plurality of input queues that receive the packets of data from the one or more networks according to a priority scheme, and wherein automatically configuring the Quality of Service parameters of the ports according to the services and the associations between the planned data flows and the services comprises:
   associating one or more of the queues with one or more of the services.

33. The computer program of claim 25, wherein automatically configuring the ports according to the services and the associations between the planned data flows and the services comprises:
   applying an input filter at an input port for the planned data flow.

34. The computer program of claim 25, wherein each data flow comprises a plurality of packets, and wherein the services are selected from the group consisting of:
   ensuring that each packet in the associated data flow will experience the least possible latency in the network device;
   ensuring that no packet in the associated data flow will experience more than a predetermined latency in the network device;
   guaranteeing a minimum bandwidth for the packets in the associated data flow;
   ensuring a predetermined bandwidth range for the packets in the associated data flow;
   dropping or marking drop precedence for packets exceeding a predetermined bandwidth in the associated data flow;
   prioritizing the packets in the associated data flow; and
   dropping all packets in the associated data flow.

35. The computer program of claim 25, wherein a network switch comprises the network device.

* * * * *